(12) United States Patent
Nichogi et al.

(10) Patent No.: US 7,324,700 B2
(45) Date of Patent: Jan. 29, 2008

(54) IMAGE PROCESSOR WITH SHARPNESS ENHANCEMENT

(75) Inventors: Mutsuko Nichogi, Fuchu (JP); Katsuhiro Kanamori, Nara (JP); Makoto Oishi, Asaka (JP); Norimichi Tsumura, Chiba (JP); Yoichi Miyake, Sakura (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 666 days.

(21) Appl. No.: 10/809,775

(22) Filed: Mar. 25, 2004

(65) Prior Publication Data

US 2004/0246262 A1    Dec. 9, 2004

(30) Foreign Application Priority Data

Mar. 28, 2003    (JP)    ............................. 2003-091203

(51) Int. Cl.
   *G06T 5/00*    (2006.01)
(52) U.S. Cl. ........................................ 382/254
(58) Field of Classification Search .................... None
   See application file for complete search history.

(56) References Cited

U.S. PATENT DOCUMENTS 4,945,502 A * 7/1990 Kwon et al. ................ 382/275
5,638,498 A * 6/1997 Tyler et al. ................. 358/1.18
5,809,179 A * 9/1998 Marimont et al. ........... 382/254
5,987,169 A * 11/1999 Daly et al. .................. 348/631
2004/0036923 A1* 2/2004 Kokemohr et al. ......... 358/3.27

FOREIGN PATENT DOCUMENTS

JP    2002-108757    4/2002

OTHER PUBLICATIONS

M. Kocher and M. Kunt, "Image Data Compression by Contour Texture Modeling", Apr. 1983, Proceedings of the SPIE, 1983 pp. 131-139.*
H. Kotera, "Digital Image Processing Techniques for Hardcopy", Japan Print Society, vol. 25, No. 3, pp. 39-47, (1988), with English Abstract.

* cited by examiner

*Primary Examiner*—Brian Werner
*Assistant Examiner*—Thomas M Redding
(74) *Attorney, Agent, or Firm*—RatnerPrestia

(57) ABSTRACT

When an image inputted is displayed on the display, determined is an enhancing degree as a parameter for enhancing the sharpness of the input image by using at least one of information about a subject included in the input image and information about the display for displaying the input image. By using the enhancing degree determined, color distribution is controlled on a first principal component analysis axis obtained by analysis based on a principal component analysis in a color space. Furthermore, the texture of the subject is magnified in size and again mapped onto the subject. Due to this, the input image can be enhancement-processed to a well texture feeling easy to view.

19 Claims, 18 Drawing Sheets

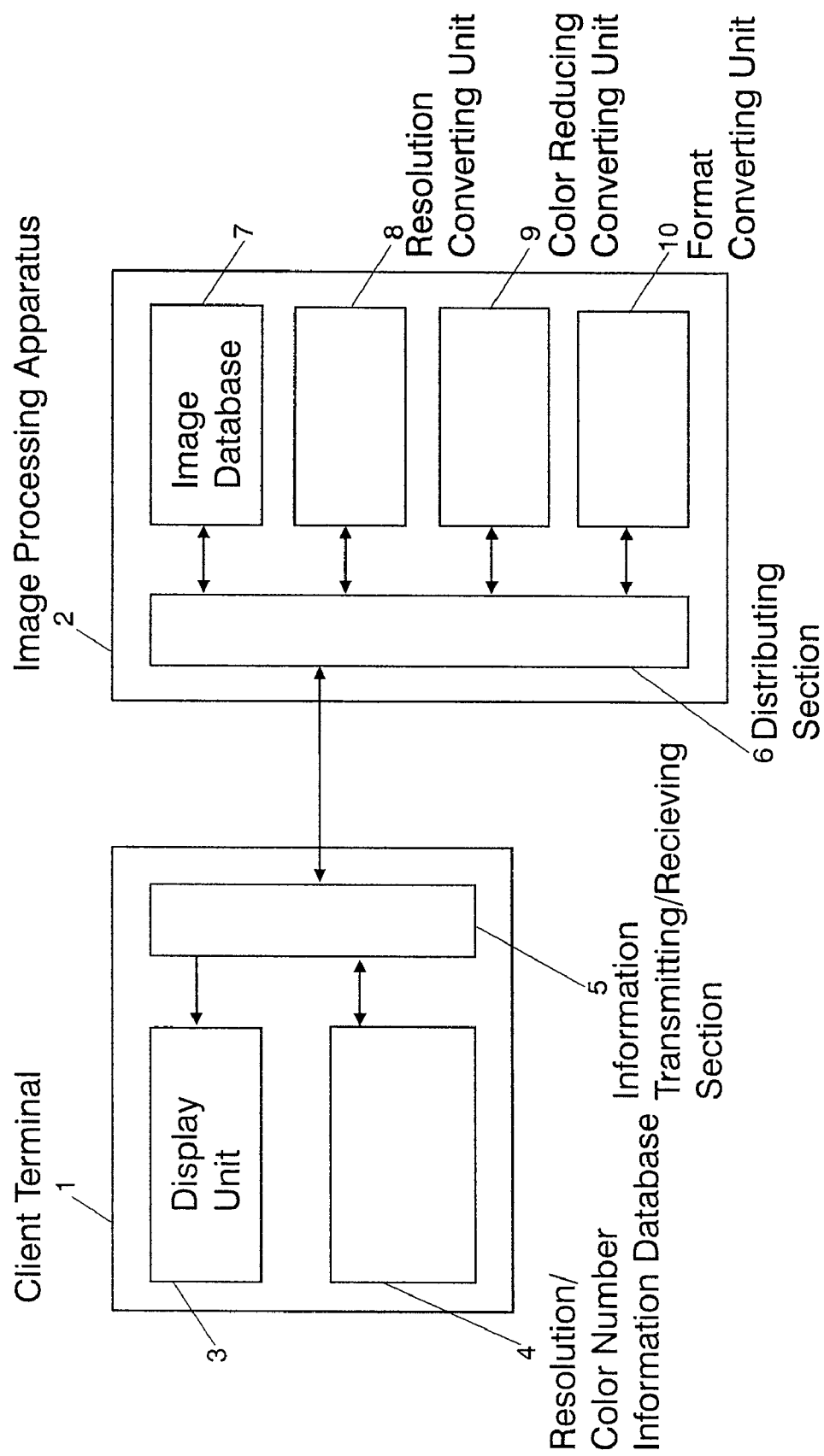

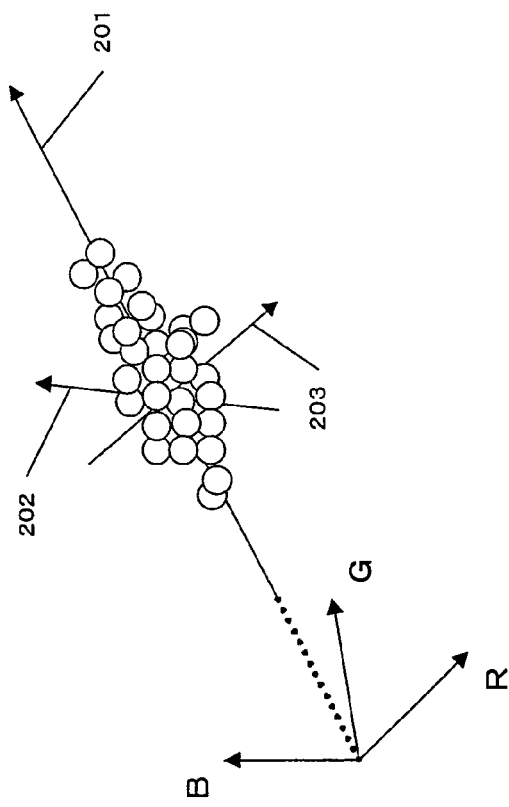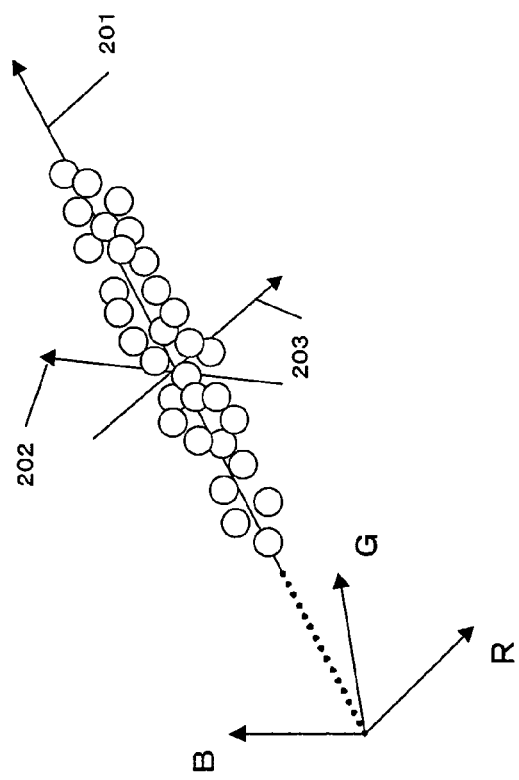
Fig. 5A
Fig. 5B

FIG.11

| | RESOLUTION BY PIXEL SIZE [pix/mm] | OBSERVATION DISTANCE [cm] | ON-DISPLAY IMAGE SIZE [cm] | VIEWING ANGLE TO ACTUAL IMAGE [degree] | VIEWING-ANGLE REFERENCE RESOLUTION [cycles/degree] |
|---|---|---|---|---|---|
| DESKTOP DISPLAY | 3.783 | 50 | 2.66 | 3.05° | 32.7 |
| CELLULAR TELEPHONE DISPLAY | 4.125 | 30 | 1.6 | 3.05° | 21.6 |

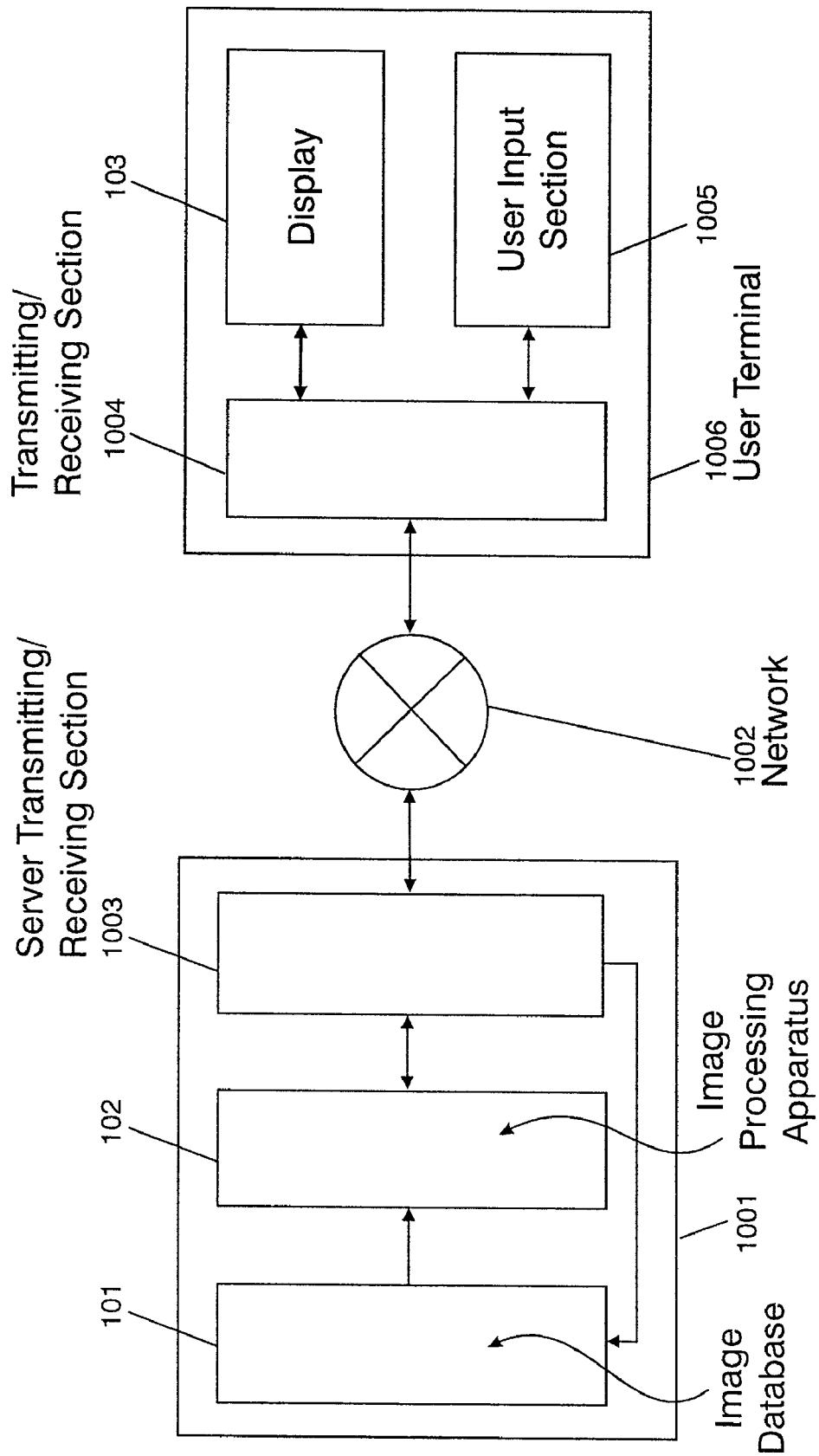

FIG.14

```
<?xml version="1.0"?>
<rdf:RDF xmlns:rdf=http://www.w3.org/19999/02/20-rdf-syntax-ns#>
<rdf:Description>
<prf:Vendor>Panasonic</prf:Vendor>
<prf:ImageCapable>Yes</prf:ImageCapable>
<prf:ColorCapable>Yes</prf:ColorCapable>
<prf:BitsPerPixel>24</prf:BitsPerPixel>
<prf:ScreenSize>120x102</prf:ScreenSize>
<prf:CcppAccept>
<rdf:Bag>
<rdf:li>image/gif</rdf:li>
</rdf:Bag>
</prf:CcppAccept>
    .  .
</rdf:Description>
</rdf:RDF>
```

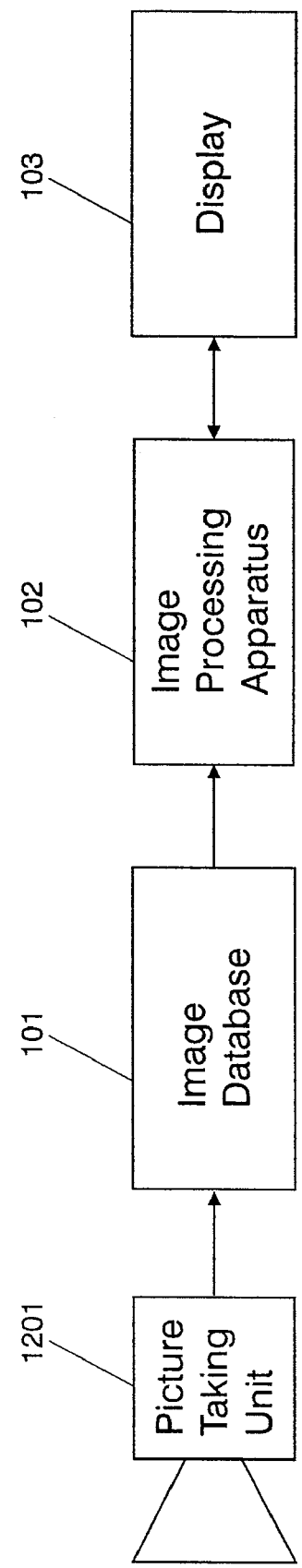

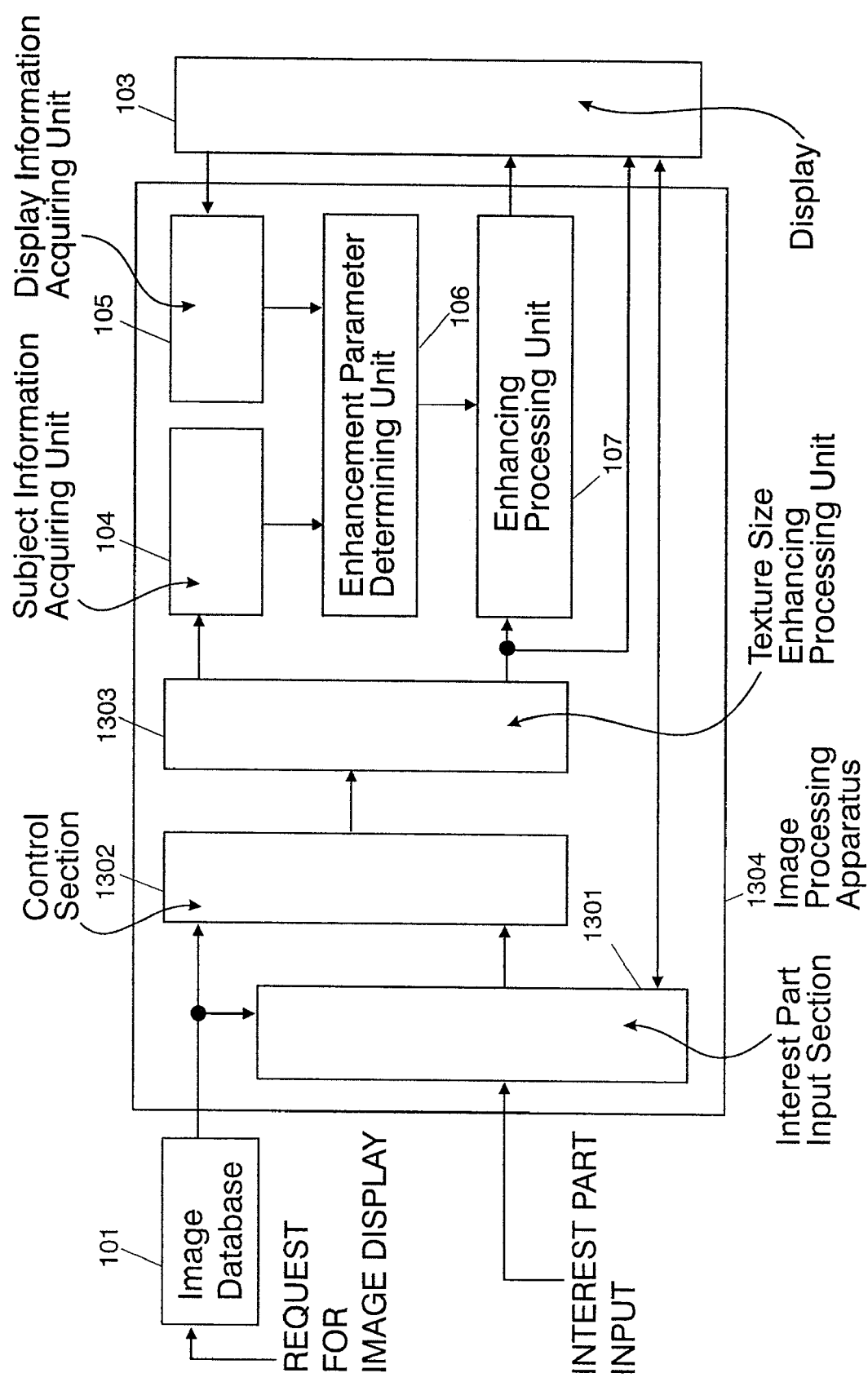

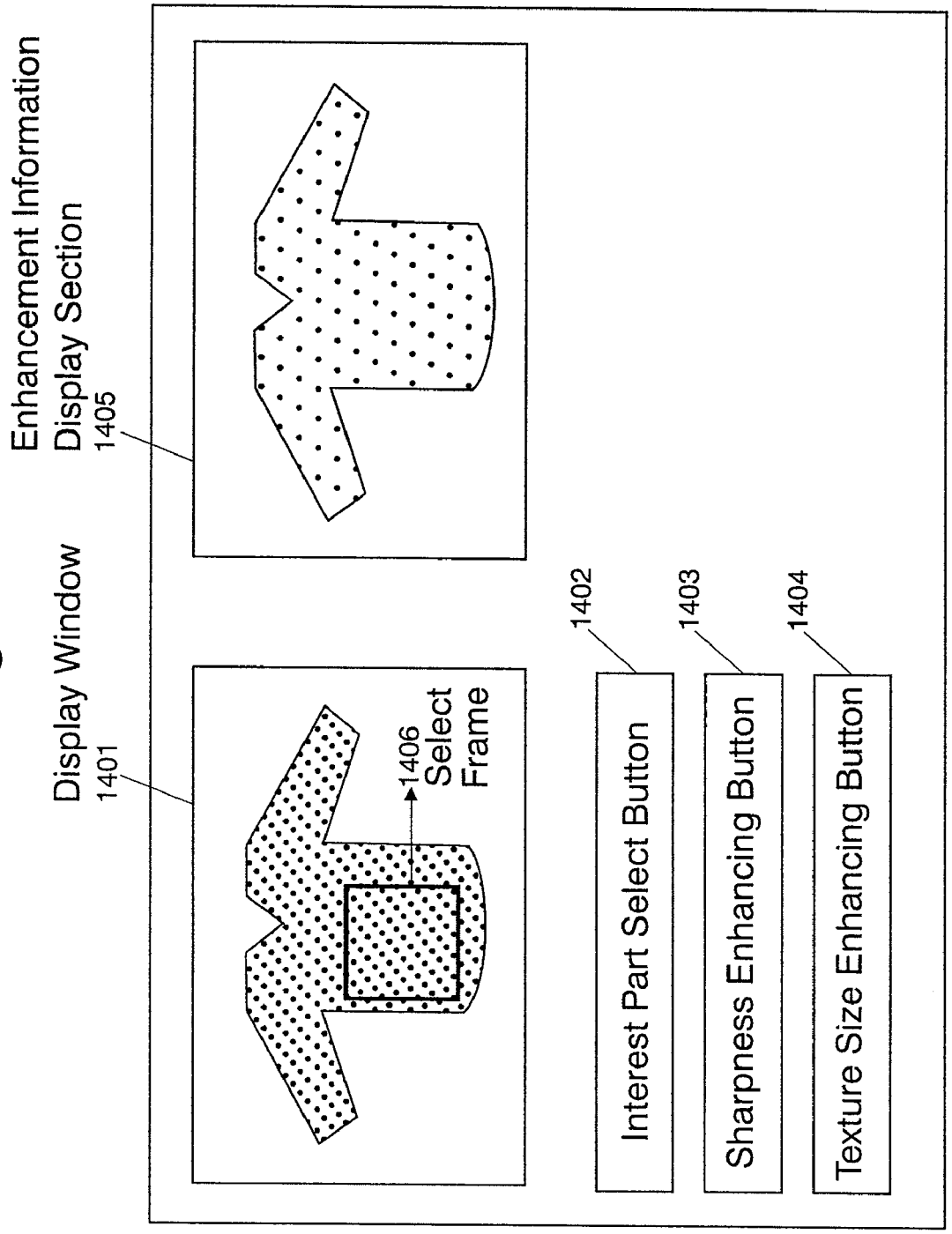

IMAGE PROCESSOR WITH SHARPNESS ENHANCEMENT

FIELD OF THE INVENTION

This invention relates to an apparatus and method for processing an image which is to process an input image to a high texture quality and displaying it on the display screen.

BACKGROUND OF THE INVENTION

Recently, the on-line shopping through the Internet becomes quite familiar along with the spread of asymmetric digital subscriber line (ADSL), high-speed line such as optical fibers, and personal computers into the general households.

Internet shopping is convenient in that, by choosing a desired item from a wide variety of commodities while staying at home, the procedure can be easily proceeded from an order up to product reception. Meanwhile, considering from the vendor, there is no necessity to hold the actual store. Moreover, customers are widespread throughout the world.

However, in Internet shopping, the user is not allowed to make certain of a real product by his/her own eyes. For this reason, most vendor site describes a notice "Picture may differ from the real, please acknowledge" or the like. However, there are actually not a few complaints and returns of commodities from users. Accordingly, there is a desire for displaying a product image with a well texture feeling to a possible high extent on the user's display.

In the meanwhile, the display the user is using is in a size nearly 15 to 17 inches for a personal computer, and several inches for a PDA or cellular telephone.

The image processing techniques, for an image to be displayed on the user's display, include resolution conversion, reducing colors and format conversion, in conformity to the characteristic of the display as a destination of output.

Meanwhile, JP-A-2002-108757 describes an art that, taking account of a length-width ratio to put a content image on a low-resolution screen of a portable digital assistant, image conversion is carried out by rotating the image and further scaling down the same.

FIG. 1 is a diagram showing an arrangement of an image processing system in the prior art, which is to send and receive an image at between a server and a client. A client terminal 1 has a display unit 3, a resolution/color-number information database 4 and an information transmitting/receiving section 5. A server-type image processing apparatus 2 has a distributing section 6, an image database 7, a resolution converting unit 8, a color reducing converting unit 9 and a format converting unit 10. The both are connected together by the Internet or the like.

By the information transmitting/receiving section 5 of the client terminal 1, a signal requesting for an image to be desirably displayed on the display unit 3 is sent to the server-type image processing apparatus 2. At this time, simultaneously sent is the information about the resolution of and the number of displayable colors on the display unit 3. In the server-type image processing apparatus 2, the distributing section 6 receives the image request of from the information transmitting/receiving section 5 and reads out an image requested out of the images stored in the image database 7. The resolution converting unit 8 carries out a conversion as to the resolution and the height-width information about the image as requested to a size on the display unit 3. Meanwhile, the color reducing converting unit 9 makes a conversion to adapt the number of colors of the requested image to the colors displayable on the display unit 3. The format converting unit 10 converts the image into a format to be processed on the application software of the client terminal 1.

The image thus processed is sent from the distributing section 6 to the client terminal 1 where it is received by the information transmitting/receiving section 5 and then displayed on the display unit 3.

In the FIG. 1 arrangement, because the resolution converting unit 8 merely converts the image size into a size on the display unit 3, the product image is lost in sharpness due to resolution insufficiency. Thus, it is impossible to convey correctly the texture feeling of a product to the user. Particularly, there is a problem that it is quite difficult to know from the image a precise texture and material granular feeling of the product.

Consequently, in order to reproduce a high-resolution image on the low-resolution display unit 3, there is a need to carry out a sharpness enhancing process on the input image. Meanwhile, such deformation as appealing the user is required in order to convey the texture feeling of actual product over to the observer. Thus, deformation enhancing process is needed to carry out.

The conventional methods for improving the texture feeling include, for example, an unsharp mask to enhance image sharpness (see e.g. "Digital Image Technology III—Image Digital Processing in Printing (1)" by Hiroaki Kotera, pp 39-47, Japan Print Society Vol. 25, No. 3, 1988). The unsharp mask is a filter that the original image is first blurred to compute a differential between the blurred image and the original image, and the differential image is adjusted to further combine together the original image and the adjusted differential image thereby effecting a sharpness-increasing process.

However, concerning the unsharp mask for the conventional sharpness enhancing process, no considerations are made as to the direction in which sharpness is to enhance. Due to this, in the case the image acquired by an input device is deteriorated due to the affection of noise, the noise in certain cases is possibly made conspicuous.

FIG. 2A is a color distribution on an input image prepared by virtually adding noise to a texture image of a textile such as a sweater, shown in a color space represented by 8-bit digital data on each of pixel RGB colors. FIG. 2B is a color distribution of the input image of FIG. 2A increased in sharpness by means of an unsharp mask.

As shown in FIG. 2B, the sharpness enhancing process is problematically made noise more conspicuous than that prior to the sharpness enhancing process because of entire expansion of color distribution.

FIG. 3A shows a color distribution in RGB color space as a result of a principal components analysis on a low-resolution input image while FIG. 3B shows a color distribution in RGB color space as a result of a principal components analysis on a high-resolution input image. Here, the first primary component axis 1701 obtained as a result of principal components analysis is assumed as a direction of a color component of the input image.

From FIG. 3B, it can be seen that, concerning the image color distribution, the input image having a higher resolution has a distribution broader in the color component direction than that having a lower resolution, without extending in the other directions. Accordingly, as shown in FIG. 3B, it can be considered an ideal sharpness enhancing process to obtain the same color distribution as that raised in resolution.

Meanwhile, with the conventional unsharp mask, enhancing degree is controlled by weighting a high-frequency component in order to suppress against lightness variation and partial saturation occurrence. Also, the weighting value to a high-frequency component is determined empirically of enhancing processing, hence raising a problem the processing is complicate.

Meanwhile, in the case of computer graphics (CG), used are three-dimensional shape information and texture information to be mapped onto a shape. However, the texture in use is to be mapped without image-processing the texture of a subject. Due to this, there is a problem that, where the image is displayed on the display of a small-sized terminal unit, the texture is not easy to visually perceive because of insufficient resolution.

Also, in the case the resolution of display is secured, there encounters a problem that, when the subject is displayed in the entire by size-reduction, the texture is not easy to visually perceive because of resolution insufficiency.

SUMMARY OF THE INVENTION

The present invention has been made in view of those points, and it is an object thereof to provide an apparatus and method for processing an image which is for carrying out an enhancing process capable of obtaining an image easy to view with well texture feeling from an image inputted to the display unit while reducing the noise caused by enhancing process as observed in the prior art wherein the enhancing process can be made in accordance with the input image and the information about the display unit.

In the invention, when an image inputted is displayed on the display, a parameter is determined by using at least one of information about a subject included in the input image and information about the display for displaying the input image. By using the parameter determined, color distribution is controlled on a first primary component axis obtained by principal component analysis in a color space. Furthermore, by magnifying in size the texture of the subject and mapping it again onto the subject, the input image can be enhancement-processed to a well texture feeling easy to view.

Meanwhile, in the case of compressing the input image, the input image is separated into shape data and texture data and compressed respectively. The compression process of the texture data is realized by once lowering the resolution of the input image. On the other hand, after the texture data at low resolution is reconstructed, for the low-resolution texture data, color distribution is controlled on the first primary component axis in the color space, thereby carrying out an enhancing process with well texture feeling.

Furthermore, the user observing an image displayed on the display unit is allowed to select, as an interest part, a part interested in of the input image, whereby the image enhancing process is to be made to the interest part.

By the above arrangement, it is possible to reproduce even on a low-resolution display an image having a texture feeling equivalent to the image to be reproduced on a high-resolution display. The texture feeling of an actual product can be reproduced on the display. Furthermore, efficient compression of an image can be realized.

BRIEF DESCRIPTION OF THE DRAWINGS

FIG. 1 is a block diagram showing an arrangement of an image processing system in the prior art;

FIGS. 5A and 5B are a color distribution figure explaining the expansion of the color distribution by the image processing method according to the first embodiment of the invention;

FIG. 11 is a table explaining a resolution in the image processing method according to the first embodiment of the invention;

FIG. 13 is a block diagram of a client server apparatus showing an application example of the image processing apparatus according to the first embodiment of the invention;

FIG. 14 is a concept figure showing a terminal-unit information description example based on CC/PP in the image processing apparatus according to the first embodiment of the invention;

FIG. 15 is a block diagram showing an arrangement of a digital still camera including the image processing apparatus according to the first embodiment of the invention;

FIG. 16 is a block diagram showing an arrangement of an image processing apparatus according to a second embodiment of the invention;

FIG. 17 is a concept figure showing a user interface in the image processing apparatus according to the second embodiment of the invention.

DESCRIPTION OF THE EXEMPLARY EMBODIMENT

Exemplary embodiments of the present invention are demonstrated hereinafter with reference to the accompanying drawings.

1. First Exemplary Embodiment

Figure 2A:
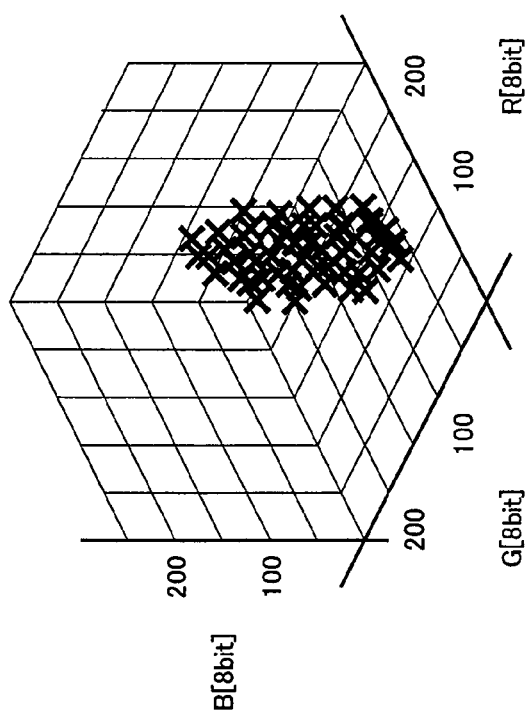
FIGS. 2A and 2B are a color distribution figure explaining an enhancement result due to a conventional unsharp mask.
Figure 2B:
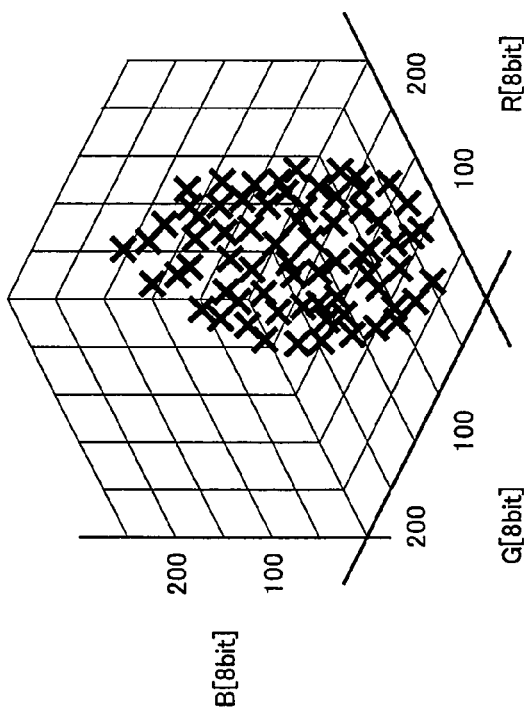
Figure 3A:
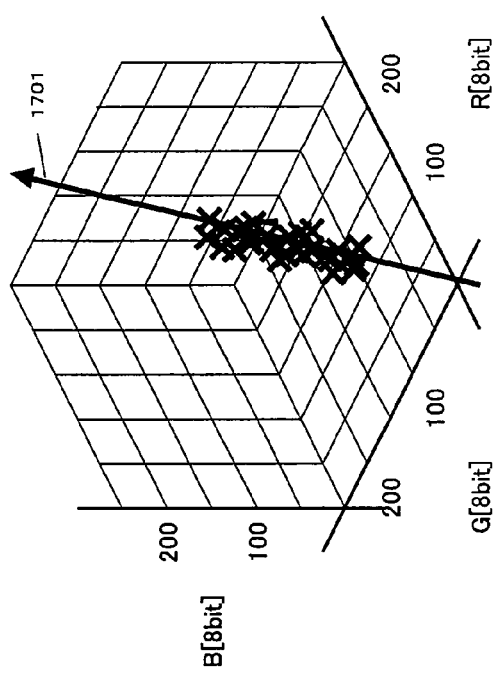
FIGS. 3A and 3B are a color-space distribution figure with textures different in resolution in the prior art.
Figure 3B:
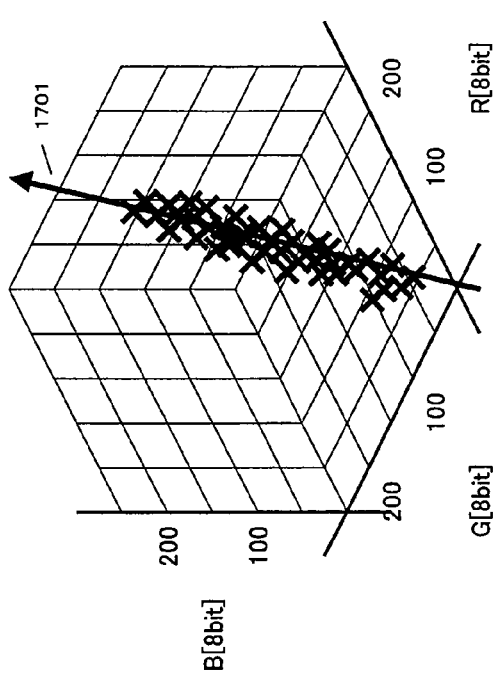
Figure 4:
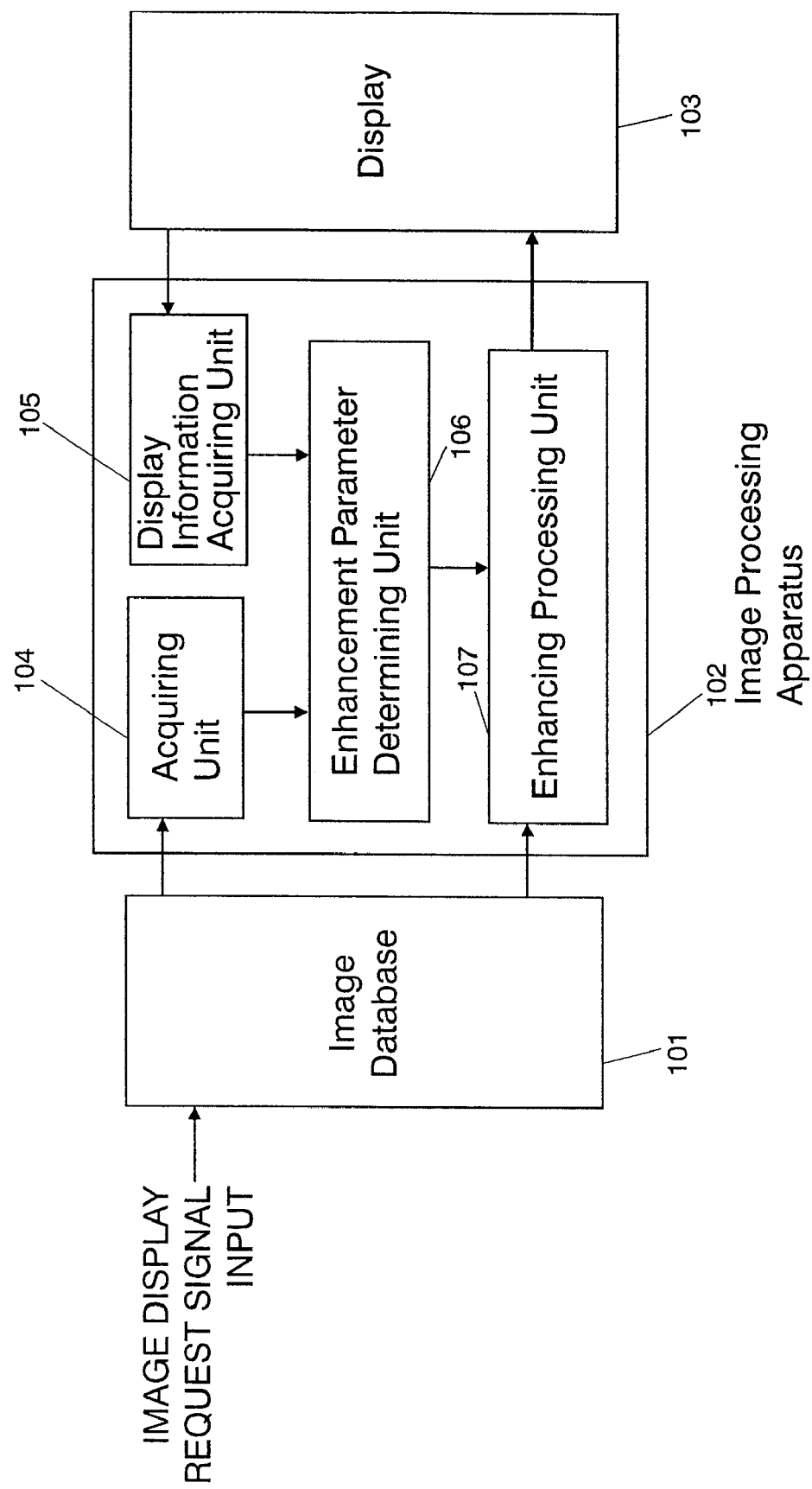
FIG. 4 is a block diagram showing an arrangement of an image processing apparatus according to a first embodiment of the present invention.

FIG. 4 is a diagram showing an arrangement of an image processing apparatus according to embodiment 1 of the present invention.

In FIG. 4, an image database 101 is stored with a plurality of images to be displayed on a display 103. The image database 101 outputs an image requested by an image display request signal that requests an image to be displayed on the display 103, and inputs it to a subject-information acquiring unit 104 and enhancing processing unit 107. An image processing apparatus 102 is configured including a subject-information acquiring unit 104, a display-information acquiring unit 105, an enhancement-parameter determining unit 106 and an enhancement-processing unit 107.

The subject-information acquiring unit 104 acquires the subject information contained in an image inputted from the image database 101. In this embodiment, it is assumed that subject information is previously stored at the header of the image. Incidentally, although not shown, arrangement may be made to directly acquire subject information from the image by further adding an image recognition unit. Subject information will be detailed in the later.

The display-information acquiring unit 105 acquires display information from the display 103 being used by the user. Display information includes a maximum luminance, a contrast, a resolution and displayable color number. Particularly, this embodiment explains, as display information, resolution as a factor the most determinative of image sharpness.

The enhancement-parameter determining unit 106 determines an enhancement parameter value for use in a sharpness enhancing process, by using the subject information of from the subject-information acquiring unit 104 and the display information of from the display-information acquiring unit 105. Enhancement parameter will be detailed in the later.

The enhancing processing unit 107 carries out a sharpness enhancing process for enhancing the sharpness in the input image by using an enhancement parameter as determined by the enhancement-parameter determining unit 106, and outputs it as display image onto the display 103.

Now explained is the detailed operation of the enhancing processing unit 107. In this embodiment, the sharpness-enhancing process to be implemented in the enhancing processing unit 107 includes the first and second methods. The first method is to make an enhancement without making noises conspicuous by taking account of the direction of a color that sharpness is to enhance within the color space. The second method is to carry out a sharpness enhancing process according to the first method after reducing the low-frequency component in the color space.

At first, the first sharpness enhancing process is explained.

As was explained in the prior art, by improving the resolution, the color distribution of an input image expands over the first primary component axis in a color component direction. Consequently, it can be seen that, where the display is low in resolution, color distribution may be expanded in the direction of the first primary-component axis in order to supplement for resolution shortage.

Now explained is an operation to expand the color distribution of input image in the direction of the first primary-component axis direction as a color component by using FIGS. 5A and 5B. FIG. 5A is a color distribution figure of before expanding the color distribution of input image while FIG. 5B is a color distribution figure of after expanding the input image of color distribution of FIG. 5A in a direction of the first primary-component axis 201. Expanding the distribution of color includes a method of multiplying a constant value on the first primary component value of the pixel of an input image, and a method of adding a constant value to the first primary component value on each pixel of the input image. In this embodiment, a random number is multiplied on the first primary component value of each pixel of the input image, to expand only the first primary component value in the color component direction. Should the color distribution be expanded in a second primary component axis 202 or third primary component axis 203 in a direction other than the first primary component axis 201 as a color direction component, the image would become an image enhanced in noise. Accordingly, for the second and third primary component values, conversion is to the former color space without multiplying a random number.

Now explained is a concrete procedure of the sharpness-enhancing process method explained above of the invention, by using FIG. 6.

Provided that the input image has a pixel vector of $g_i$ and a function controlling the particulate is $G(x)$, the image of after the sharpness enhancing process has a pixel vector $f_i$ as defined by Equation 1.

$$f_i = G(g_i) \qquad \text{Equation 1}$$

where i is a pixel number ($1i \leq X \times Y$: X is the number of pixels in the horizontal direction of the image while Y is the number of pixels in the vertical direction of the image). It is assumed that the each pixel vector $f_i$ in Equation 1 has elements of R, G and B values that are to be expressed by Equation 2.

$$g_i = \begin{bmatrix} g_{Ri} \\ g_{Gi} \\ g_{Bi} \end{bmatrix} \qquad \text{Equation 2}$$

$$f_i = \begin{bmatrix} f_{Ri} \\ f_{Gi} \\ f_{Bi} \end{bmatrix}$$

Figure 6:
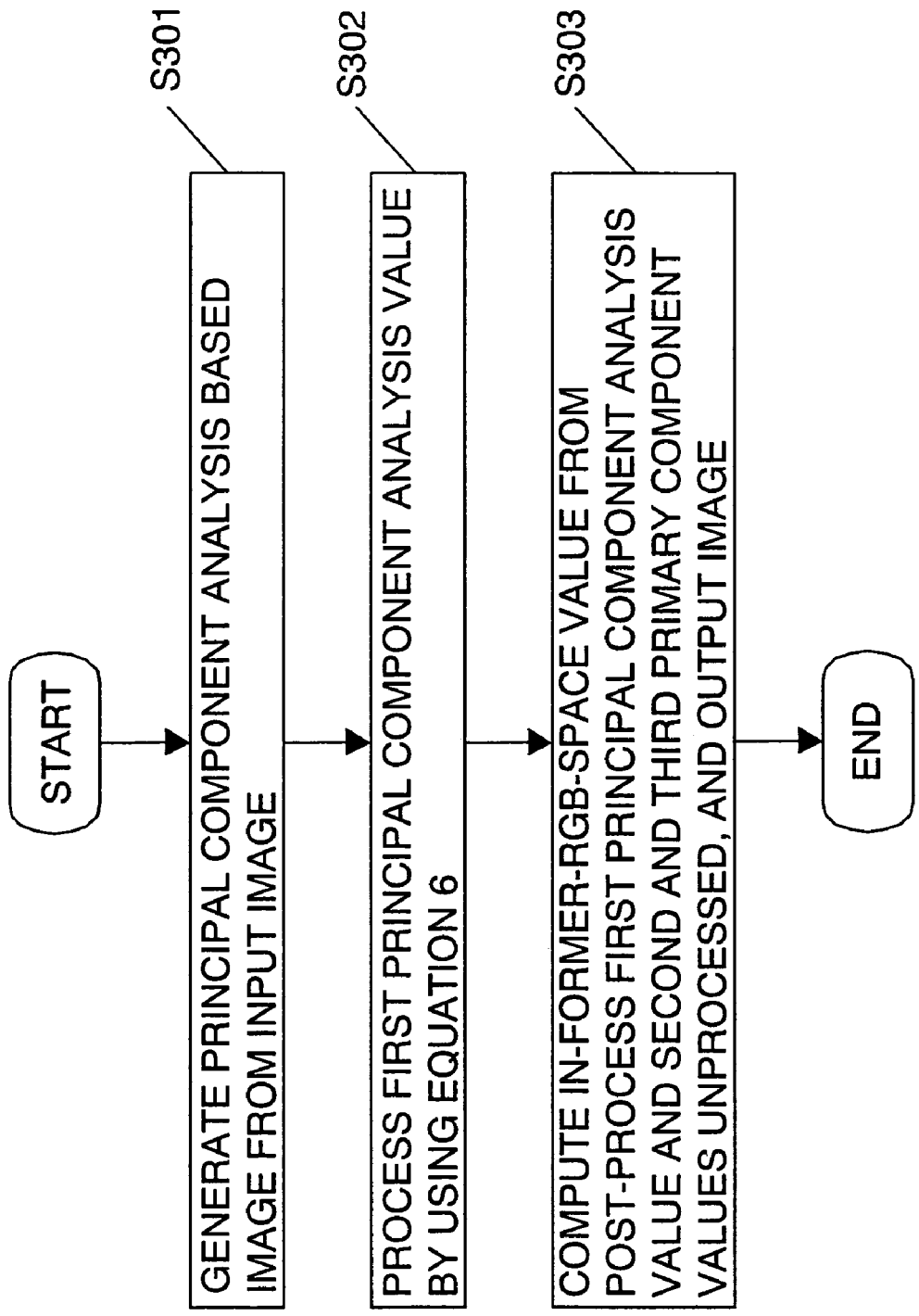
FIG. 6 is a flowchart explaining an image enhancing process in the image processing method according to the first embodiment of the invention.

In FIG. 6, at S301, the input image is analyzed based on the principal component analysis, to generate first to third primary component value on each pixel. Specifically, by taking a mean pixel vector of input image as $g_{ave}$ and a covariance matrix as $C_{gg}$, the covariance matrix $C_{gg}$ of the input image is determined by using Equation 3. In Equation 3, $\{\ \}^T$ represents a transposition.

$$C_{gg} = (g_i - g_{ave})(g_i - g_{ave})^T \qquad \text{Equation 3}$$

$$= \frac{1}{n} \begin{bmatrix} \sum_{i=1}^{n}(g_{Ri} - g_{Rave})(g_{Ri} - g_{Rave}) & \sum_{i=1}^{n}(g_{Ri} - g_{Rave})(g_{Gi} - g_{Gave}) & \sum_{i=1}^{n}(g_{Ri} - g_{Rave})(g_{Bi} - g_{Bave}) \\ \sum_{i=1}^{n}(g_{Gi} - g_{Gave})(g_{Ri} - g_{Rave}) & \sum_{i=1}^{n}(g_{Gi} - g_{Gave})(g_{Gi} - g_{Gave}) & \sum_{i=1}^{n}(g_{Gi} - g_{Gave})(g_{Bi} - g_{Bave}) \\ \sum_{i=1}^{n}(g_{Bi} - g_{Bave})(g_{Ri} - g_{Rave}) & \sum_{i=1}^{n}(g_{Bi} - g_{Bave})(g_{Gi} - g_{Gave}) & \sum_{i=1}^{n}(g_{Bi} - g_{Bave})(g_{Bi} - g_{Bave}) \end{bmatrix}$$

$$= \begin{bmatrix} \sigma_{gR}^2 & \sigma_{gRgG} & \sigma_{gRgB} \\ \sigma_{gRgG} & \sigma_{gG}^2 & \sigma_{gGgB} \\ \sigma_{gRgB} & \sigma_{gGgB} & \sigma_{gB}^2 \end{bmatrix}$$

Then the covariance matrix $C_{gg}$ is expanded by singular value decomposition, as in Equation 4.

$$C_{gg} = P_g \Lambda_g P_g^T \qquad \text{Equation 4}$$

$$= \begin{bmatrix} P_{g1} \\ P_{g2} \\ P_{g3} \end{bmatrix} \begin{bmatrix} \sigma_{g1}^2 & 0 & 0 \\ 0 & \sigma_{g2}^2 & 0 \\ 0 & 0 & \sigma_{g3}^2 \end{bmatrix} \begin{bmatrix} P_{g1} \\ P_{g2} \\ P_{g3} \end{bmatrix}^T$$

In Equation 4, $\Lambda g$ is a diagonal matrix having the diagonal elements of eigenvalues $(\sigma_{g1})^2$, $(\sigma_{g2})^2$ and $(\sigma_{g3})^2$ of $C_{gg}$ while $P_g$ is a matrix having the elements of eigenvectors $P_{g1}$, $P_{g2}$ and $P_{g3}$ of $C_{gg}$.

By using the eigenvector $P_g$ thus determined, all-the-pixel vector $g_i$ is converted into primary component pixel vector $w_i$ by Equation 5.

$$w_i = P_g(g_i - g_{ave}) \qquad \text{Equation 5}$$

where $w_i$ is constituted by the first, second and third primary component values and can be expressed as $w_i = [w_{i1}, w_{i2}, w_{i3}]^T$.

At S302, in order to control the granular feeling of the image, the computed first primary component value $w_{i1}$, on each pixel, is multiplied by the value r obtained by multiplying the enhancing degree R obtained in the enhancement-parameter determining unit 106 by a random number "random", as shown in Equation 6. This is added to the first primary component value wi1, thereby obtaining a new primary component value $v_{i1}$. The enhancing degree R is referred in the later.

$$v_{i1} = (1+r) \cdot w_{i1}; \quad r = R \times \text{random} \qquad \text{Equation 6}$$

Then, at S303, the output primary component pixel vector $v = [v_{i1}, w_{i2}, w_{i3}]^T$, constituted by the first primary component value vi1 newly computed by Equation 6 and the unprocessed second and third primary component values, is converted into a value of the former RGB space. Specifically, the former RGB value is determined by using Equation 7.

$$f_i = P_g^T v^i + g_{ave} \qquad \text{Equation 7}$$

By the above procedure, a display image can be computed which is enhanced in sharpness without increasing noise.

Figure 7:
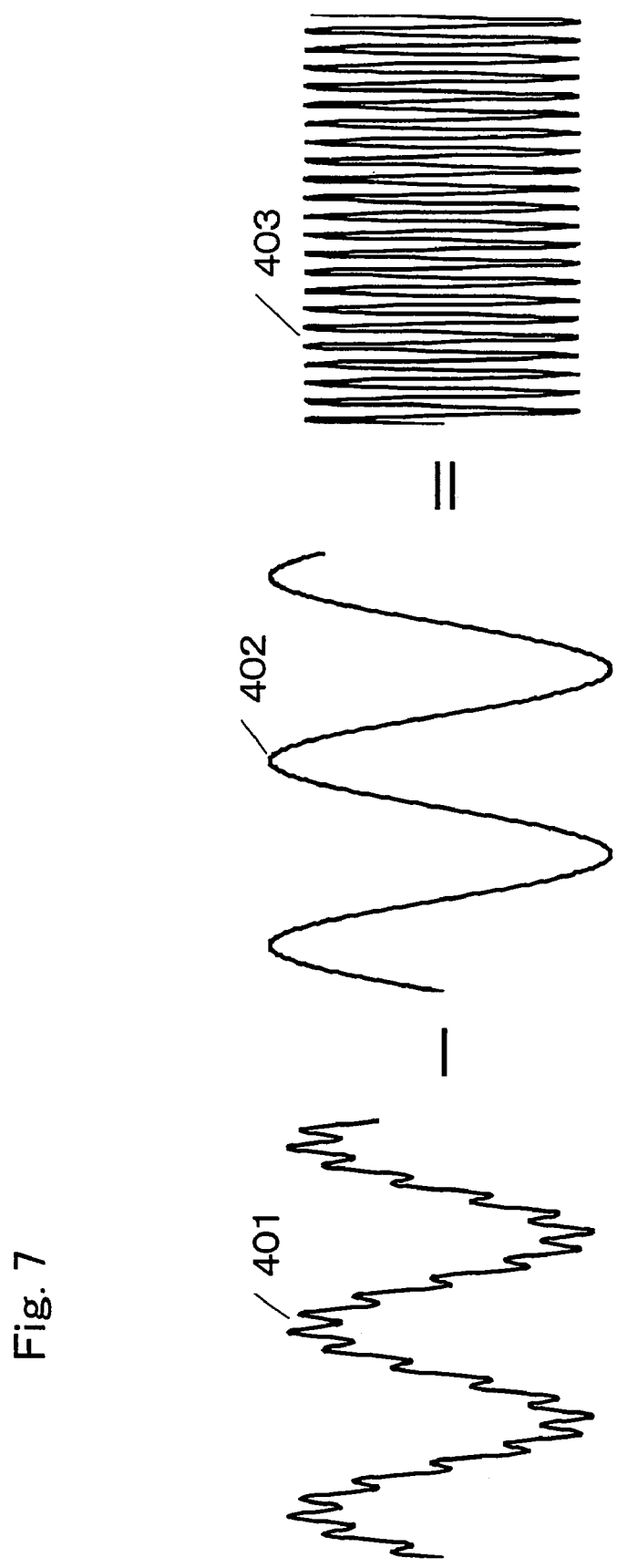
FIG. 7 is a waveform figure explaining a sharpness enhancing process in the image processing method according to the first embodiment of the invention.

Now explained is a second sharpness enhancing process by using FIG. 7. Likewise the unsharp mask in the prior art, computed is a difference between an input image 401 and an blurred image 402 the input image is made blur, thereby removing the low-frequency portion of the image, to thereafter carry out the first sharpness enhancing process on the remaining high-frequency component 403. This method can supplement the high-frequency component 403 to be lost from the image due to the reduction of resolution, thus making the sharpening process suitable.

Incidentally, in this embodiment, the blurred image 402 is provided by rendering to a half the resolution of the input image. By lowering the resolution, it is possible to make an image based only on a low-frequency component.

Figure 8:
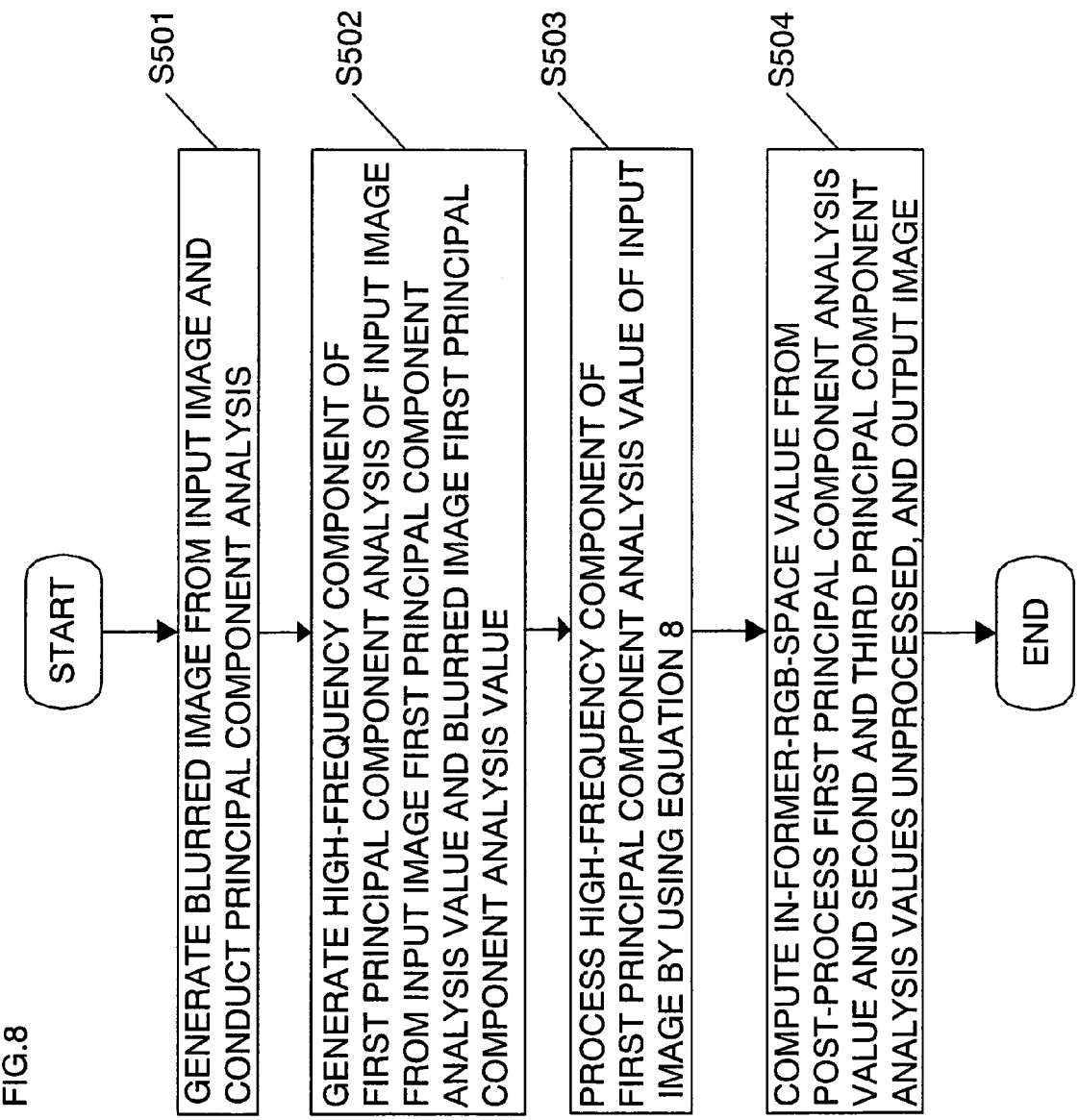
FIG. 8 is a flowchart explaining a sharpness enhancing process in the image processing method according to the first embodiment of the invention.

Explained is a concrete procedure of the second sharpness enhancing process method by using FIG. 8.

At first, at S501, a blurred pixel vector value $g_i^*$ is obtained from the pixel vector $g_i$ of an input image. The pixel vector $g_i$ and the blur pixel vector $g_i^*$ of the input image are substituted in Equations 3 to 5, thereby conducting a principal component analysis.

At S502, computed are a first primary component value $w_{i1}$ of the input-image pixel vector $g_i$ and a first primary component value $w_{i1}^*$ of the blur-image pixel vector $g_i^*$. $w_{i1}^*$ is the pixel value of only a low-frequency element of $w_{i1}$. By computing a difference between the both, it is possible to obtain only a high-frequency component of $w_{i1}$.

At S503, the high-frequency component computed at S502, on each pixel, is multiplied by the value r obtained by multiplying the enhancing degree R obtained in the enhancement-parameter determining unit 106 by a random number "random", as shown in Equation 8. Then, the low-frequency component $w_{i1}^*$ of the first primary component value of blurred image is added to compute a first primary component value $v_{i1}$ enhanced only in the high frequency component. Incidentally, enhancing degree R is referred in the later.

$$v_i = w_{i1} + (1+r) \cdot (w_{i1} - w_{i1}^*); \quad r = R \times \text{random} \qquad \text{Equation 8}$$

At S504, the output primary component pixel-vector $vi = [v_{i1}, w_{i2}, w_{i3}]^T$, constituted by the first primary component value $v_{i1}$ newly computed by Equation 8 and the unprocessed second and third primary component values, is converted into a value of in the former RGB space. Note that using r instead of (1+r) can obtain the similar effect.

In the second sharpness enhancing process, because enhances only the high-frequency portion without dependent upon the pixel value of the low-frequency component, the high-frequency wave only is enhanced to provide the advantage that lightness variation and partial saturation are not to occur.

Now explained is an operation of the enhancement-parameter determining unit 106.

The enhancement-parameter determining unit 106 is to determine an enhancing degree R, a parameter to be used in a sharpness enhancing process in the enhancing processing unit 107, on the basis of at least one of the subject information and the display information.

The subject information can use, for example, a statistic amount representative of a ratio of the high-frequency component in a material texture image. Besides, this can be computed by using a standard deviation value "sdev" representative of a pixel value variation of a differential image, wherein the differential image of a blurred image is acquired from the first primary component value.

Figure 9A:
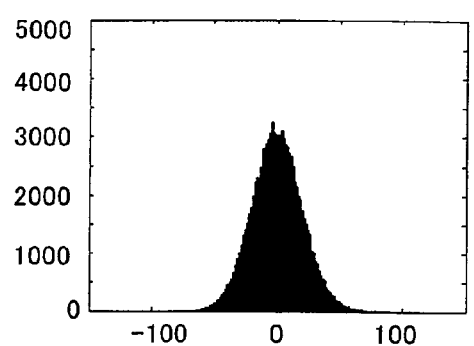
FIGS. 9A-9E are a waveform figure showing subject information in the image processing method according to the first embodiment of the invention.
Figure 9D:
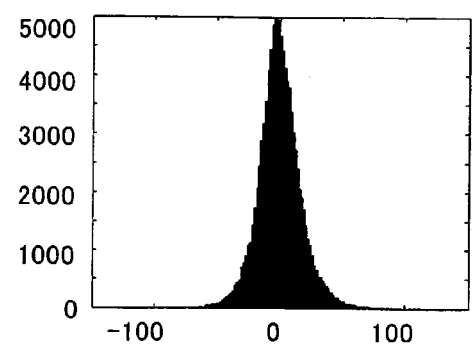
Figure 9B:
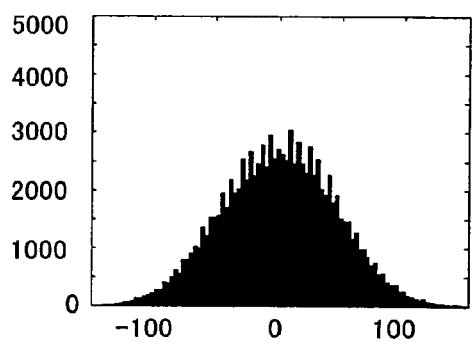

FIG. 9A is a frequency representation of pixel values of a differential image of a knit. FIG. 9B is a frequency representation of pixel values of a differential image of a denim.

Figure 9E:
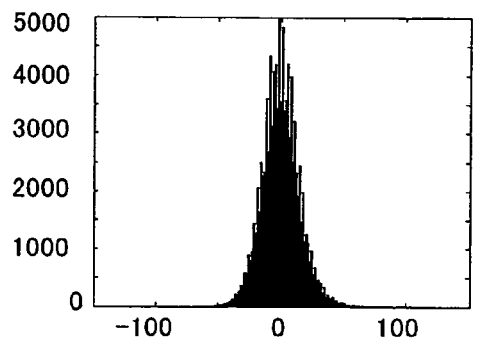
Figure 9C:
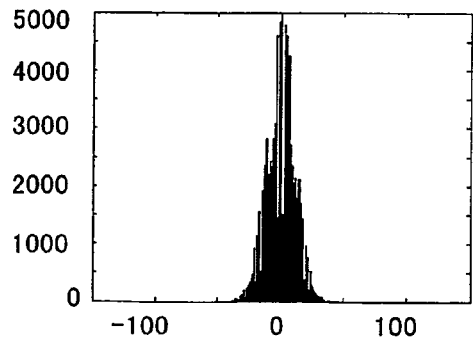

FIG. 9C is a frequency representation of pixel values of a differential image of a carpet-a. FIG. 9D is a frequency representation of pixel values of a differential image of a carpet-b. FIG. 9E is a frequency representation of pixel values of a differential image of a plastic. In this manner, because the frequency of pixel values of a differential image assumes a normal distribution, the standard deviation value can be used as subject information.

Figure 10:
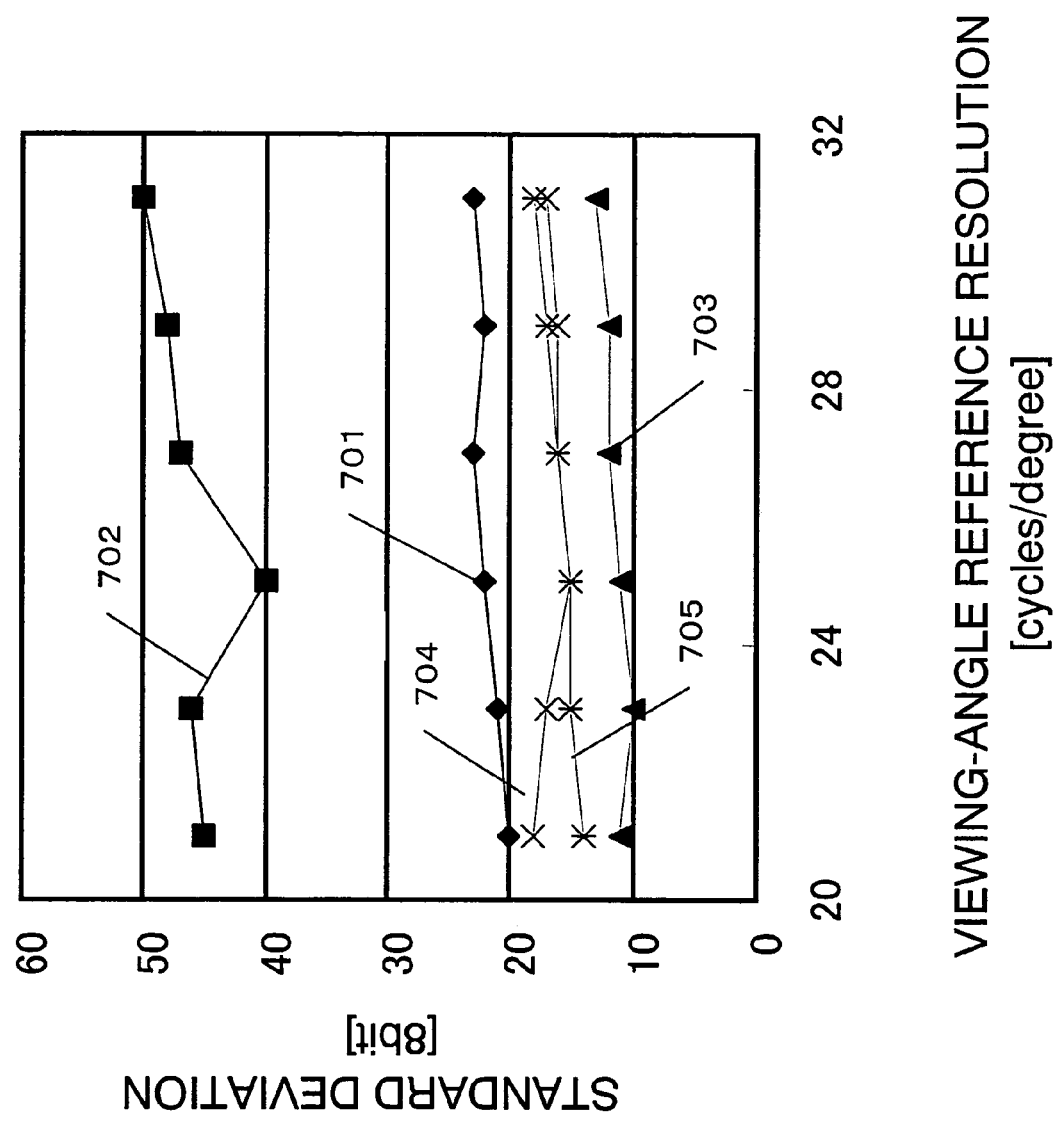
FIG. 10 is a graph showing a relationship between a resolution and a standard deviation in the image processing method according to the first embodiment of the invention.

Meanwhile, FIG. 10 is a graph showing the relationship between a viewing-angle reference resolution and a standard deviation. Here, parameters are a knit 701, a denim 702, a carpet-a 703, a carpet-b 704 and a plastic 705, wherein the ordinate represents a standard deviation while the abscissa represents a viewing-angle reference resolution. It can be confirmed from FIG. 10 that the change of standard deviation values are not large with respect to the change in resolution of the input image. Thus, the standard deviation value can employed as information about the subject information.

In the above, the subject information was explained with the example of a statistic amount representative of a ratio of a high-frequency component in a material texture image. However, it is possible to employ at least one of a power spectrum of a subject, a statistic amount concerning a high-frequency component of a power spectrum, a power spectrum of a subject texture, a statistic amount concerning a high-frequency component of a power spectrum of a subject texture, a size of a subject texture. By using these pieces of subject information, the change of subject information is not made great with respect to the change of resolution of the subject. Thus, enhancing degree is easy to set.

Now explained is the case display information uses a resolution of the display 103.

The distance in observing the display 103 differs depending upon a size of the display 103. FIG. 11 shows a figure showing a resolution of a desktop display and cellular-telephone display. Provided that the cellular telephone display has a size of approximately 2 inches, the resolution based on pixel size is 4.125 [pixs/mm]. Provided that the desktop display has a size of approximately 17 inches, the resolution based on pixel size is 3.8 [pixs/mm]. Thus, the cellular telephone display is higher in resolution.

However, in the usual state of use, the desktop display is at a distance of nearly 50 [cm] from the observer while the cellular telephone display is at a distance of some 30 [cm] from the observer. The distance of observation is different, i.e. the cellular telephone display is nearer in distance to the observer. Consequently, in the case that the image size as can be viewed by the observer is equal on the desktop display and the cellular telephone display, the observer is to feel the cellular telephone display having a lower resolution than that of the desktop display.

This can be understood by a consideration with reference to the resolution dependent upon a viewing angle. The viewing-angle reference resolution "resolution", taking account of a viewing angle, is expressed by Equation 9 and based on the unit [cycles/degree].

$$\text{Resolution} = \text{Pixel-size-based resolution} \times \text{Actual image size/Viewing angle to on-display image} \quad \text{Equation 9}$$

For example, the observer is to observe the same image size in the case an image having a width of 1.6 cm is displayed on the cellular telephone display in a size of some 2 inches located at a distance of 30 cm and in the case an image having a width of 2.66 cm is displayed on the desktop display in a size of about 17 inches located at a distance of 50 cm. The viewing angle at this time is 3.05 degrees to the image on the display.

Computing a viewing-angle reference resolution on the desktop display and cellular telephone display of FIG. 11 by using Equation 9, the viewing-angle reference resolution "resolution" on the desktop display is 32.7 [cycles/degree] because of a resolution of pixel size of 3.8 [pixs/mm], an actual image size of 2.66 [cm] and a viewing angle to the on-display image of 3.05 [degree]. On the other hand, the viewing-angle reference resolution "resolution" on the cellular telephone display is 21.6 [cycles/degree]. The resolution to be felt the observer is higher in resolution on the desktop display.

Now explained is how to determine an enhancing degree R, by using a "sdev" value as subject information and a viewing-angle reference resolution "resolution" as display information. The enhancing degree R can be determined by Equation 10.

$$R = -0.14 \cdot \text{resolution} + sdev \quad \text{Equation 10}$$

By taking an enhancing degree R at an summing-up value of a "sdev" value, as subject information, and display-information "resolution", the enhancing degree can be approximated in a linear representation of the display information. Thus, the enhancing degree becomes easy to set. Namely, enhancing degree R changes nearly linearly owing to the resolution "resolution".

Equation 10 is considered proper from the following subjective evaluation experiment although largely varied by a the texture of a subject. In the subjective evaluation experiment, for the examinee, a high-resolution image was displayed in a left-half region of a liquid-crystal display as a desktop display while displaying 33 stages of images different in enhancing degrees with six low-resolutions in the right half region. For these, the user was prompted to select an enhancing degree at which the high-resolution image and the low-resolution image were to be equally perceived.

Meanwhile, the experiment used the Haproscopic method with an observation distance of 50 cm under semi-darkness. This is because the human eye has a nature to be adapted to the lightest color in the field of view so that the provision of a partition between the left and right eyes isolates the left and right eye's adaptations from each other.

Figure 12:
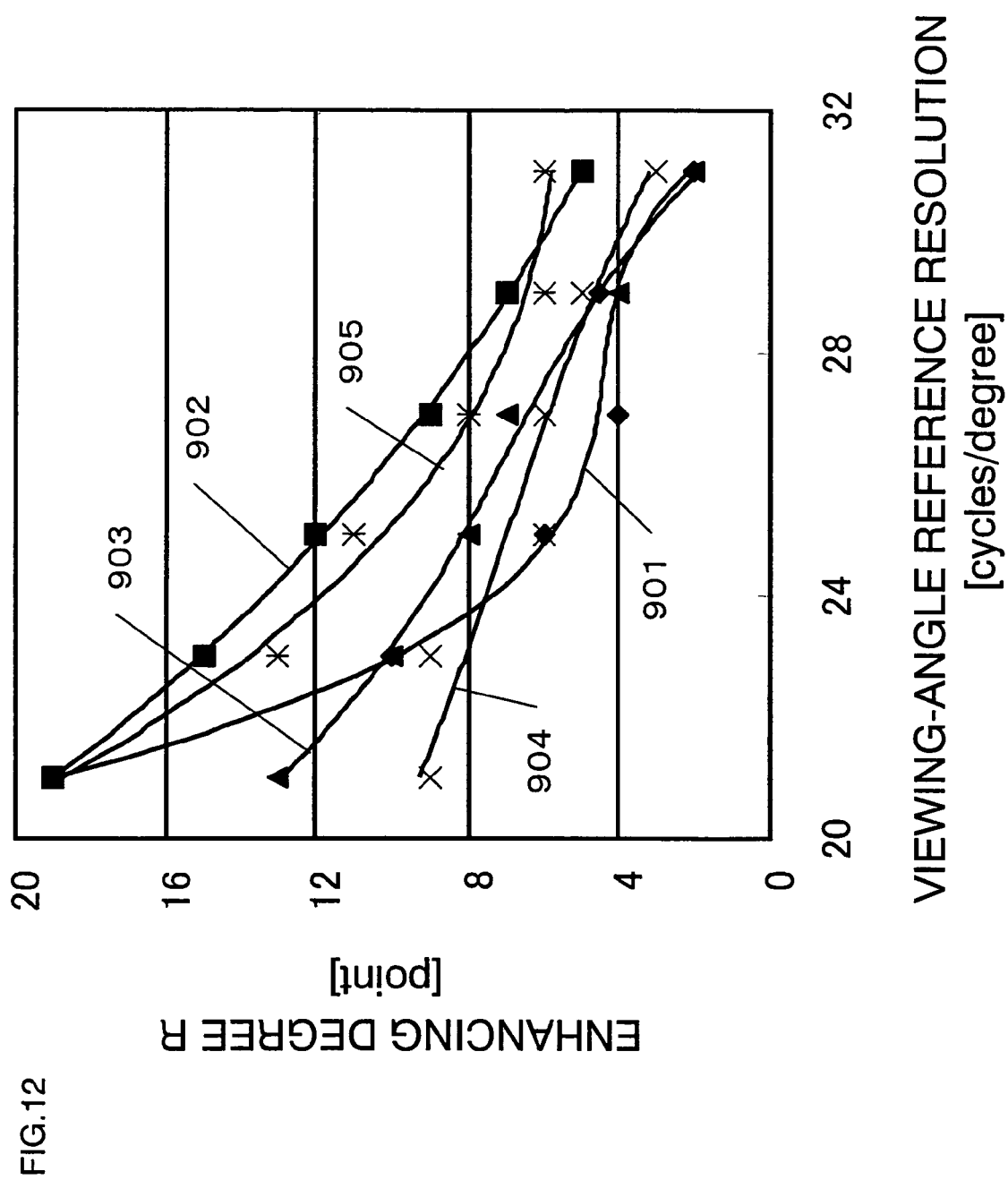
FIG. 12 is a graph showing a relationship between an enhancement parameter and a resolution in the image processing method according to the first embodiment of the invention.

The result of subjective evaluation experiment is shown in FIG. 12. The abscissa of the FIG. 12 graph represents a viewing-angle reference resolution while the ordinate represents an enhancing degree R. Parameters are a knit 901, a denim 902, a carpet-a 903, a carpet-b 904 and a plastic 905. It can be seen that, although the knit 901 is in a curve different from the other materials, the other materials vary nearly linearly in enhancing degree. FIG. 10 is a formulation of this subjective evaluation experiment.

Consequently, the enhancement-parameter determining unit 106 may determine an enhancing degree R by using Equation 10 or the result of subjective evaluation experiment shown in FIG. 12.

The enhancing degree R can be determined by using at least one or both of an "sdev" value as. subject information and a viewing-angle reference resolution "resolution".

Meanwhile, in order to determine an enhancing degree R at which the texture feeling of an actual product can be reproduced on the display, the actual product may be put left in the subjective evaluation experiment.

FIG. 13 shows an arrangement of a client server apparatus allowing for an image server 1001 utilizing the image processing apparatus 102 of embodiment 1 to communicate with a user terminal 1006 through the utilization of a network.

In FIG. 13, the image server 1001 is arranged by the image database 101 and image processing apparatus 102 explained on FIG. 4, and a server transmitting/receiving section 1003. The user terminal 1006 is arranged by the display 103 explained on FIG. 4, a user input section 1005 and a transmitting/receiving section 1004.

The server transmitting/receiving section 1003 sends an image whose sharpness has been enhancement-processed by the image processing apparatus 102 to the user terminal 1006 through the network 1002. Meanwhile, the server transmitting/receiving section 1003 receives display information about the display 103 and an image-display request signal from the user terminal 1006.

The user input section 1005 is a unit for selecting an image the user is to display on the display 103 and outputting an image-display request signal. The transmitting/receiving section 1004 sends display information about the display 103 and an image-display request signal to the image server 1001 through the network 1002, and receives an image whose sharpness has been enhancement-processed from the image server 1001.

Now the operation is explained. When the user inputs an image-display request signal concerning an image the user desires to display on the user terminal by the user input section 1005, the image-display request signal and display information are outputted to the transmitting/receiving section 1004. The transmitting/receiving section 1004 sends the image-display request signal and display information to the image server 1001 through the network 1002.

The server transmitting/receiving section 1003 within the image server 1001 receives the image-display request signal and display information, and outputs the display information to the image processing apparatus 102 and the image-display request signal to the image database 101.

The image database 101 reads out the requested image and supplies it to the image processing apparatus 102. The image processing apparatus 102 carries out a sharpness enhancing process, noted before, on the image inputted from the image database 101 by the use of the display information about the user terminal 1006 received from the server transmitting/receiving section 1003, and outputs the image of after sharpness enhancing processing to the server transmitting/receiving section 1003. The server transmitting/receiving section 1003 sends the image of after sharpness enhancing processing to the user terminal 1006 through the network 1002.

In the user terminal 1006, the transmitting/receiving section 1004 receives the image of after sharpness enhancing processing and outputs onto the display 103, thus displaying thereon the image of after sharpness enhancing processing.

Incidentally, display information acquisition from the user terminal 1006 can be realized in the form of adding an information tag required in information addition technique to http header, e.g. Cookie and CC/PP (Composite Capability/Preference Profiles). FIG. 14 shows an example of terminal-information description by means of CC/PP. Here, there are described information about a manufacturer on line 4 and information about a display size on 8 line.

As above, the use of the image processing apparatus 102 of this embodiment allows to reproduce an image having a sharpness enhancement-processed without being dependent upon the resolution of the display 103 to be used by the user.

The image processing apparatus 102 of this embodiment, if used on a digital camera, allows to display an image higher in texture feeling on the display 103 of the digital camera.

FIG. 15 shows a diagram showing an arrangement of a digital camera making use of the image processing apparatus 102 of this embodiment.

A picture-taking unit 1201 takes a picture of a subject and converts it into an image of digital data. The image taken a picture of by the picture-taking unit 1201 is stored to an image database 101. This arrangement is similar to that of the digital camera in the prior art.

The image processing apparatus 102 carries out a sharpness enhancing process on the image stored in the image database 101 in a manner matched to the characteristic of the display 103. This enhances the sharpness of the image and supplements for the resolution shortage of the image. This makes it possible to provide a digital camera capable of displaying an image higher in texture feeling on the display 103.

As in the above, the present embodiment, when displaying an input image on the display, determines an enhancing degree by using at least one of subject information contained in the input image and display information as information about the display on which the input image is, to be displayed, and carries out a sharpness enhancing process on the input image. This can generate an image best suited for display and high in texture feeling.

Meanwhile, by taking an enhancing degree at a summed-up value of subject information and display information, the enhancing degree can be approximated in the linear representation of display information, making the enhancing degree easy to set.

Meanwhile, by expanding the color distribution of input image by a first primary component value in color space, noise can be reduced to control texture feeling even in an input image deteriorated in image quality. The image, having a texture feeling equivalent to that of the image to be reproduced even on a high-resolution display, is allowed to be reproduced on a low-resolution display. Therefore, it is possible to implement an image processing that the texture feeling of an actual product is to be reproduced on the display.

2. Second Exemplary Embodiment

The first embodiment determined the enhancing degree by taking as a parameter at least one of subject information contained in an input image and display information for displaying the input image when displaying the image on the display, and carried out an image process to enhance the sharpness in a color space by taking an enhancing direction in the color space on the first primary component axis of the color space.

Contrary to this, this embodiment discloses a method of magnifying, in size, a subject texture and mapping the same again onto the subject, as a method to enhance spatially the texture feeling of an image configured by three-dimensional shape of information such as computer graphics and texture information to be mapped onto the shape.

This embodiment has a mapping texture added to the sharpness enhancing process disclosed in the first embodiment, so that the texture can be magnified in size with deformation and mapped. The user is allowed to easily grasp the information of a subject.

Meanwhile, the user observing an image is allowed to input, as an interest part, a part of an interest of an input image. The processing of the image is made only to the interest part.

FIG. 16 is a diagram showing an arrangement of an image processing apparatus 1304 according to a second embodiment. The same elements as those of FIG. 4 are attached by the same references, to omit explanation thereof. An interest-part input section 1301 is a unit for the user to input an interest part of the image. A control section 1302 is a unit for receiving an input by the interest-part input section 1301 and selects an area to be enhanced of the image, thereby determining an enhancing process to be made to the selected area. A texture-size enhancing process unit 1303 is a unit for magnifying a texture in size and carrying out an enhancing process thereon.

Now the operation is explained. At first, when the user asks the image database 101 for an image to be displayed on the display 103, the image database 101 reads out the input image the user has asked and outputs it to the control section 1302. Then, when the user inputs an interest part of the input image to the interest-part input section 1301, the interest-part input section 1301 outputs to a control section 1302 an interest-part select signal representative of an interest part as an interest area on the input image the user has asked. The control section 1302 selects an interest part from the input image by using the interest-part select signal inputted from the interest-part input section 1301, and outputs it to a texture-size enhancing process unit 1303.

The texture-size enhancing process unit 1303 magnifies in size the texture relative to the selected interest part and makes a mapping of it again onto the input image, thus outputting the input image of after texture-size enhancing process to the subject-information acquiring unit 104 and enhancing processing unit 107. The input image of after texture-size enhancing process is outputted to the display 103 and displayed thereon if necessary.

The subject-information acquiring unit 104, display-information acquiring unit 105, enhancement-parameter determining unit 106 and enhancing processing unit 107 carries out a sharpness enhancing process on the input image of after texture-size enhancing process and outputs it to the display 103, similarly to the first embodiment explained in FIG. 4.

FIG. 17 is an example of a user interface of the interest-part-input section 1301. In FIG. 14, a display window 1401 is to display an input image of before image processing the user desires to display. The interest-part select button 1402 is a button allowing for the user to check when selecting an interest part of the input image. After checking, an interest part can be selected of the input image by the use of a mouse or the like. The sharpness enhancing button 1403 is to be checked when to carrying out a sharpness enhancing process on the selected interest part. The texture-size enhancing button 1404 is to be checked when to carry out a texture-size enhancing process to the selected interest part. The enhancement-information display section 1405 is to display a processed image that the enhancing process made on the selected interest part is again mapped onto the input image.

In case the user asks for image display, a designated image is displayed in the display window 1401.

Then, when the user checks the interest-part select button 1402, a select frame 1406 is displayed in the display window 1401. The user can change the size and position of the select frame 1406 by the mouse or the like, to select an interest part. The interest-part select button 1402, when checked, is inverted in color. This can confirm a presence or absence of checking.

In the case that a sharpness enhancing process is made to the selected interest part, the sharpness enhancing button 1403 is checked. When making a texture-size enhancing process, the texture-size enhancing button 1404 is checked. Incidentally, the magnification of texture can be determined, for example, by a subjective evaluation experiment on the both eyes in the left and right as shown in embodiment 1. Meanwhile, magnification may be determined such that the texture assumes the maximum size within the enhancement-information display section 1405. Incidentally, in FIG. 17, texture is represented by dots so that the magnification in size of texture can be expressed by increasing the interval of the dots.

An interest-part select signal is caused by checking the interest-part select button 1402 while a signal representative of an enhancing processing method is caused by checking the sharpness enhancing button 1403 and/or texture-size enhancing check button 1404. These signals are outputted to the control section 1302.

Incidentally, the enhancement-information display section 1405 displays an image of after enhancing process. The user is allowed to confirm as to a texture size magnified or situation of sharpness enhancing process.

As in the above, this embodiment can provide an image processing apparatus and information processing method capable of displaying an image raised in material granular feeling of a subject by magnifying in size a subject texture and making a mapping of it again onto the subject, in a process to spatially enhance sharpness in addition to a sharpness enhancing process. Meanwhile, texture can be made easy to view by displaying an input image on the display of a small-sized terminal.

Meanwhile, by inputting as an interest part a part the user observing the image has an interest from an input image and selecting a plurality of enhancing processes, it is possible to provide an image processing apparatus capable of providing the optimal image for the user.

3. Third Exemplary Embodiment

This embodiment discloses an image processing system for compressing an image and reconstructing the same from compression. The images to be handled in this embodiment are directed to those that can be separated into three-dimensional shape dada such as computer graphics and texture data to be mapped onto the shape data. However, similar handling is possible with those to be separated into two-dimensional shape dada and texture data to be mapped onto the two-dimensional shape data, without limited to the three-dimensional.

Figure 18:
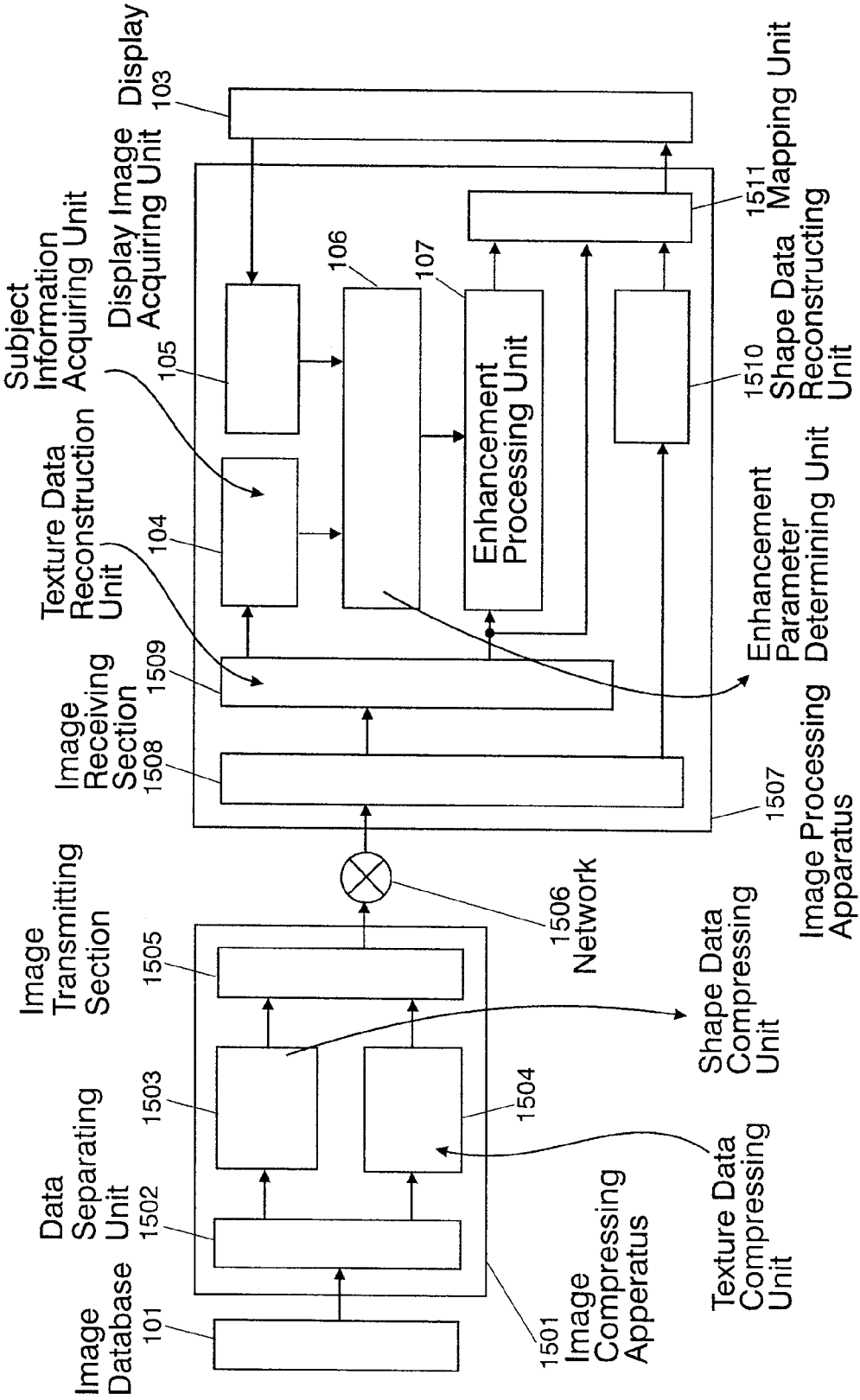
FIG. 18 is a block diagram showing an arrangement of an image processing apparatus according to a third embodiment of the invention.

FIG. 18 is a diagram showing an arrangement of an image processing system according to a third embodiment of the invention.

An image compressing apparatus 1501, for compressing and sending an input image, is configured by a data separating unit 1502, a shape-data compressing unit 1503, a texture-data compressing unit 1504 and an image transmitting section 1505. The data separating unit 1502 separates an input image into shape data and texture data. The separated shape data is compressed in the shape-data compressing unit 1503 while the separated texture data is compressed in the texture-data compressing unit 1504. The both are combined together in the image transmitting section 1505 and sent as a data-compressed image through a network 1506.

The image processing apparatus 1507, for reconstructing and enhancement-processes the compressed image received, is configured by adding an image receiving section 1508, texture-data reconstructing unit 1509, shape-data reconstructing unit 1510 and mapping unit 1511 to the arrangement including the subject-information acquiring unit 104, display-image acquiring unit 105, enhancement-parameter determining unit 106 and enhancing processing unit 107 explained in FIG. 4.

The image receiving section 1508 receives a compressed image from the network 1506. The texture-data reconstructing unit 1509 reconstructs texture data from the compressed image received by the image receiving section 1508. The shape-data reconstructing unit 1510 reconstructs shape data from the compressed image received by the image receiving section 1508. The mapping unit 1511 makes a mapping of the texture data reconstructed by the texture-data reconstructing unit 1509 onto the shape data reconstructed by the shape-data reconstructing unit 1510, thereby making an image.

Now explained is the operation of the image processing system according to the third embodiment.

The data separating unit 1502 separates the input image read from the image database 101 into a part related to shape and a part related to texture. Where the image is two-dimensional, the image is separated into a shape and a texture by the technique of image recognition or the like. Incidentally, in the case that storage is by previous separation into a part related to a shape and a part related to a texture in the stage stored in the image database 101, the data separating unit 1502 can be omitted.

Then, the separated shape data is compressed by the shape-data compressing unit 1503 and outputted as compressed shape data to the image transmitting section 1505. Here, the shape data is described by a parameter of free curved surface such as a triangular-patched three-dimensional coordinate value, two-dimensional coordinate value, splines or NURBS, forming the shape. For compressing method such data, various forms are applicable, e.g. reversible compression method with Huffman coding. The information concerning how to compress is attached to post-compression shape data.

Meanwhile, the separated texture data is compressed in the texture-data compressing unit 1504 and outputted as compressed texture data to the image transmitting section 1505. Because the texture data is a two-dimensional image describing a texture, the data is compressed by being rendered a low resolution. Furthermore, the two-dimensional image at low resolution is compressed by the ordinary image compression method such as JPEG. This can realize a great degree of data compression. The information concerning how to compress is attached to post-compression texture.

The compressed shape data from the shape-data compressing unit 1503 and the compressed texture data from the texture-data compressing unit 1504 are supplied to the image transmitting section 1505. The image transmitting section 1505 sends the compressed shape data and compressed texture data in a separated state to the image processing apparatus 1507 through the network 1506.

In the image processing apparatus 1507, the image receiving section 1508 receives the compressed shape data and compressed texture data and outputs the received compressed shape data to the shape-data reconstructing unit 1510 and compressed texture data to the texture-data reconstructing unit 1509.

The shape-data reconstructing unit 1510 carries out a reconstruction process according to how to compress attached to the post-compression shape data.

The texture-data reconstructing unit 1509 looks up the compression information attached to the texture data, and carries out a reconstruction process according to the image compression method implemented in the texture-data compressing unit 1504. Because the reconstructed texture data is an image low in resolution, the reconstructed texture data is outputted to the subject-information acquiring unit 104 and enhancing processing unit 107, thereby carrying out a sharpness enhancing process disclosed in the first embodiment. The sharpness enhancing process in the subject-information acquiring unit 104, display-information acquiring unit 105, enhancement-parameter determining unit 106 and enhancing processing unit 107 is similar to the sharpness enhancing process in the first embodiment, and hence omitted to explain. Incidentally, it is possible to add the texture-size enhancing process explained in the second embodiment.

Incidentally, the reconstructed texture data is lowered in resolution and hence not the same as the pre-compression texture data. Obtained is a result with a texture feeling approximated to an extreme extent. Accordingly, the present compression scheme is nonreversible compression.

Then, an image for display is generated by using the shape data and texture data reconstructed by the mapping unit 1511. Herein, it is satisfactory to use a method, such as texture mapping or bump mapping used in the ordinary computer graphics. The generated image for display is displayed on the display 103.

As in the above, according to the present embodiment, the input image is separated into shape data and texture data. By using the image compression process with lowered resolution on the texture data, it is possible to carry out an image compression improved in image compression ratio and very high in efficiency.

Meanwhile, when reconstructing the compressed data separated as shape data and texture data, the texture data after reconstructed is applied by a sharpness enhancing process for improving a texture feeling, whereby the sharpness enhancing process restores the information about the input image lost by compression. Even for low-resolution texture data, reconstruction is possible as texture possessing a texture and material feeling in a level of high resolution.

Therefore, in displaying an input image on the display, generated is an image raised in texture feeling optimal for display wherein enhancing process is possible with suppression against noise occurrence.

What is claimed is:

1. An apparatus for processing an image, comprising:
    a subject information acquiring unit for extracting subject information contained in an input image from the input image;
    a display information acquiring unit for acquiring display information representative of a performance of a display for displaying the input image;
    an enhancement parameter determining unit for determining an enhancing degree as a parameter for enhancing a sharpness of the input image by using at least one of the subject information and the display information; and an enhancing processing unit for carrying out a sharpness enhancing process on the input image by expanding a distribution in a direction of a first primary component without expanding the distribution in a direction of a second or third primary component using the enhancing degree.

2. An apparatus for processing an image according to claim 1, wherein the sharpness enhancing process is to expand a distribution of a first principal component analysis value computed by analyzing, based on a primary component, a part or entire of the input image by using the enhancing degree.

3. An apparatus for processing an image according to claim 1,
wherein the input image is entirely or partially blurred;
wherein a distribution of a high-frequency component of an input image first component value is expanded by using the enhancing degree;
wherein the distribution is computed by the input image first principal component analysis value and a blurred image first principal component value;
wherein the input image first principal component analysis value is computed by analyzing the input image entirely or partially based on a primary component;
wherein the and a blurred image first principal component analysis value is computed by analyzing the blurred image based on a primary component;
wherein the blurred image first principal component analysis value and expanded distribution are added.

4. An apparatus for processing an image according to claim 1, wherein the enhancing degree is an added value of the subject information and the display information.

5. An apparatus for processing an image according to claim 1, wherein the subject information is at least one of a power spectrum of the subject, a statistic amount concerning a high-frequency component of the power spectrum, a power spectrum of a texture of the subject, a statistic amount concerning a high-frequency component of the power spectrum of the texture of the subject, and a size of the texture of the subject.

6. An apparatus for processing an image according to claim 1, wherein the display information uses at least one of a maximum luminance, a contrast, a resolution and the number of display colors.

7. An apparatus for processing an image according to claim 1, further comprising an image receiving section for receiving compressed shape data and compressed texture data, a shape data reconstructing unit for reconstructing the compressed shape data, a texture data reconstructing unit for reconstructing the compressed texture data into an input image, and a mapping unit for mapping the input image or the input image processed by the sharpness enhancing process onto the shape data reconstructed.

8. A system for processing an image including an image processing apparatus and an image compressing apparatus, wherein,
the image processing apparatus comprises:
an image receiving section for receiving compressed shape data and compressed texture data;
a shape data reconstructing unit for reconstructing the compressed shape data;
an enhancing processing unit for carrying out a sharpness enhancing process on an input image by expanding a distribution in a direction of a first primary component without expanding the distribution in a direction of a second or third primary component a texture data reconstructing unit for reconstructing the compressed texture data into the input image; and
a mapping unit for mapping the input image or the input image processed by a sharpness enhancing process onto the shape data reconstructed; and
the image compressing apparatus comprises:
a data separating unit for separating an input image into shape data and texture data;
a shape data compressing unit for compressing the shape data and attaching information about compression to the compressed data;
a texture compressing unit for compressing the texture data; and
an image transmitting unit for sending the shape data and texture data compressed.

9. A method for processing an image, comprising:
a first step of extracting subject information contained in an input image from the input image;
a second step of inputting display information representative of a performance of a display for displaying the input image;
a third step of determining an enhancing degree as a parameter for enhancing a sharpness of the input image by using at least one of the subject information and the display information; and
a fourth step of carrying out a sharpness enhancing process on the input image by expanding a distribution in a direction of a first primary component without expanding the distribution in a direction of a second or third primary component using the enhancing degree.

10. A method for processing an image according to claim 9, wherein the sharpness enhancing process is to expand a distribution of a first principal component analysis value computed by analyzing, based on a principal component analysis, a part or entire of the input image by using the enhancing degree.

11. A method for processing an image according to claim 9,
wherein the input image is entirely or partially blurred;
wherein a distribution of a high-frequency component of an input image first principal component analysis value is expanded by using the enhancing degree;
wherein the distribution is computed by the input image first principal component analysis value and a blurred image first principal component value;
wherein the input image first principal component analysis value is computed by analyzing the input image entirely or partially based on a primary component;
wherein the blurred image first principal component analysis value is computed by analyzing the blurred image based on a primary component;
wherein the blurred image first principal component analysis value and expanded distribution are added.

12. A method for processing an image according to claim 9, wherein the enhancing degree is an added value of the subject information and the display information.

13. A method for processing an image according to claim 9, wherein the subject information is at least one of a power spectrum of the subject, a statistic amount concerning a high-frequency component of the power spectrum, a power spectrum of a texture of the subject, a statistic amount concerning a high-frequency component of the power spectrum of the texture of the subject, and a size of the texture of the subject.

14. A method for processing an image according to claim 9, wherein the display information uses at least one of a maximum luminance, a contrast, a resolution and the number of display colors.

15. A method for processing an image according to claim 9, wherein the input image is made by a fifth step for receiving compressed shape data and compressed texture data, a sixth step for reconstructing the compressed shape data, and a seventh step unit for reconstructing the compressed texture data into an input image, and further comprising an eight step for mapping the input image or the input image processed by the sharpness enhancing process onto the shape data reconstructed.

16. A method for processing an image according to claim 15, wherein the compressed shape data and the compressed texture data are those that the input image is separated into shape data and texture data and the shape data and the texture data are compressed respectively.

17. A method for processing an image according to claim 16, wherein compressing the texture data is by lowering a resolution of the texture data.

18. An apparatus for processing an image, comprising:
a subject information acquiring unit for extracting subject information contained in an input image from the input image;
a display information acquiring unit for acquiring display information representative of a performance of a display for displaying the input image;
an enhancement parameter determining unit for determining an enhancing degree as a parameter for enhancing a sharpness of the input image by using at least one of the subject information and the display information; and
an enhancing processing unit for carrying out a sharpness enhancing process on the input image by expanding a distribution in a direction of a first primary component which is a color component direction of the input image using the enhancing degree.

19. A method for processing an image,
wherein subject information contained in an input image is extracted from the input image;
wherein display information representative of a performance of a display for displaying the input image is acquired;
wherein an enhancing degree as a parameter for enhancing a sharpness of the input image is determined by using at least one of the subject information and the display information; and
wherein a sharpness enhancing process is carried out on the input image by expanding a distribution in a direction of a first primary component which is a color component direction of the input image using the enhancing degree.

* * * * *

UNITED STATES PATENT AND TRADEMARK OFFICE
CERTIFICATE OF CORRECTION

| | | |
|---|---|---|
| PATENT NO. | : 7,324,700 B2 | |
| APPLICATION NO. | : 10/809775 | |
| DATED | : January 29, 2008 | |
| INVENTOR(S) | : Nichogi et al. | |

It is certified that error appears in the above-identified patent and that said Letters Patent is hereby corrected as shown below:

In column 17, line 28 of the Letters Patent, in claim 3 (Amendment claim 3), "wherein the and a blurred image" should read --wherein the blurred image--.

Signed and Sealed this

First Day of July, 2008

JON W. DUDAS
*Director of the United States Patent and Trademark Office*